(12) United States Patent
VanLund et al.

(10) Patent No.: US 9,552,816 B2
(45) Date of Patent: Jan. 24, 2017

(54) APPLICATION FOCUS IN SPEECH-BASED SYSTEMS

(71) Applicant: Amazon Technologies, Inc., Seattle, WA (US)

(72) Inventors: Peter Spalding VanLund, Seattle, WA (US); Kurt Wesley Piersol, San Jose, CA (US); James David Meyers, San Jose, CA (US); Jacob Michael Simpson, Seattle, WA (US); Vikram Kumar Gundeti, Seattle, WA (US); David Robert Thomas, Woodinville, WA (US); Andrew Christopher Miles, Lake Forrest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 220 days.

(21) Appl. No.: 14/578,056

(22) Filed: Dec. 19, 2014

(65) Prior Publication Data
US 2016/0180853 A1    Jun. 23, 2016

(51) Int. Cl.
*G10L 21/00* (2013.01)
*G10L 17/22* (2013.01)
(Continued)

(52) U.S. Cl.
CPC ............ *G10L 17/22* (2013.01); *G06F 9/5011* (2013.01); *G10L 15/22* (2013.01); *G10L 2015/223* (2013.01); *G10L 2015/228* (2013.01)

(58) Field of Classification Search
CPC ..... H04M 1/20; H04M 9/082; H04N 21/4882; H04R 25/453; H04R 3/02
(Continued)

(56) References Cited

U.S. PATENT DOCUMENTS

| | | | |
|---|---|---|---|
| 6,801,604 B2* | 10/2004 | Maes | G10L 15/30 379/88.16 |
| 7,925,031 B2* | 4/2011 | Elmedyb | H04M 1/20 381/121 |

(Continued)

FOREIGN PATENT DOCUMENTS

EP    2575128    4/2013

OTHER PUBLICATIONS

The PCT Search Report and Written Opinion mailed Apr. 14, 2016 for PCT application No. PCT/US2015/065372, 13 pages.

*Primary Examiner* — Charlotte M Baker
(74) *Attorney, Agent, or Firm* — Lee & Hayes, PLLC (57) ABSTRACT

A speech-based system includes an audio device in a user premises and a network-based service that supports use of the audio device by multiple applications. The audio device may be directed to play audio content such as music, audio books, etc. The audio device may also be directed to interact with a user through speech. The network-based service monitors event messages received from the audio device to determine which of the multiple applications currently has speech focus. When receiving speech from a user, the service first offers the corresponding meaning to the application, if any, that currently has primary speech focus. If there is no application that currently has primary speech focus, or if the application having primary speech focus is not able to respond to the meaning, the service then offers the user meaning to the application that currently has secondary speech focus.

20 Claims, 6 Drawing Sheets

(51) Int. Cl.
*G10L 15/26* (2006.01)
*G06F 9/50* (2006.01)
*G10L 15/22* (2006.01)

(58) Field of Classification Search
USPC ...... 704/275, 235, 270.1, E15.047; 707/722, 707/740; 725/58; 709/203; 455/414.1; 381/93, 381/121, 318, 83, 95, 96; 379/88.16, 88.17
See application file for complete search history.

(56) References Cited

U.S. PATENT DOCUMENTS

| | | | |
|---|---|---|---|
| 8,595,642 B1 | 11/2013 | Lagassey | |
| 2003/0040903 A1 | 2/2003 | Gerson | |
| 2007/0203699 A1 | 8/2007 | Nagashima | |
| 2011/0171941 A1* | 7/2011 | Cusick | H04N 5/44543 |
| | | | 455/414.1 |
| 2014/0012574 A1* | 1/2014 | Pasupalak | G06F 17/30554 |
| | | | 704/235 |

* cited by examiner

APPLICATION FOCUS IN SPEECH-BASED SYSTEMS

BACKGROUND

Homes, offices, automobiles, and public spaces are becoming more wired and connected with the proliferation of computing devices such as notebook computers, tablets, entertainment systems, and portable communication devices. As computing devices evolve, the ways in which users interact with these devices continue to evolve. For example, people can interact with computing devices through mechanical devices (e.g., keyboards, mice, etc.), electrical devices (e.g., touch screens, touch pads, etc.), and optical devices (e.g., motion detectors, camera, etc.). Another way to interact with computing devices is through audio devices that understand and respond to human speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes devices, systems, and techniques for interacting with users to provide services. A system as disclosed herein may be configured to receive and respond to user speech based on audio received from audio devices in the homes of different users.

A system may comprise a speech-based service that is accessed by network-based applications to provide services in conjunction with in-home audio devices. The applications may be implemented as part of the speech-based service or by third-party providers. The speech-based service allows the applications to receive information from the in-home audio devices and to perform operations using the in-home audio devices.

An application may send a command to an audio device instructing the audio device to perform an audio activity. For example, an application may instruct the audio device to play music. As another example of an audio activity, the application may instruct the audio device to play speech using text-to-speech capabilities of the speech-based service or the audio device.

An application may also conduct a speech dialog with a user through the audio device. A speech dialog comprises a sequence of speech questions, answers, and/or statements pertaining to a particular action or intent of the user. More specifically, a speech dialog may comprise a series of speech expressions that may include utterances by a user and speech messages generated by the speech-based service. A speech dialog, for example, may begin upon an initial user utterance. The speech-based service may respond by asking a question, such as "what do you want to do?" The user may respond by making a statement in answer to the question. This process may iterate until the speech-based service is able to determine a specific action to take or function to invoke.

An application may also configure the audio device to issue audible notifications in response to conditions that are detected or monitored by the audio device itself. For example, the audio device may be configured to issue an alarm at a specified time of day or after a specified time period. As another example, the audio device may be configured to issue notifications in response to events detected in conjunction with home automation or home security systems. A notification may be a passive notification that plays in the background and that does not demand immediate user attention or interaction. A notification may alternatively comprise an active or foreground notification that is louder or more insistent than a foreground notification and that calls for more immediate action or acknowledgement by the user.

The user of the audio device may provide instructions to the applications by speaking. The audio device captures sound that includes the user speech and provides a corresponding audio signal to the speech-based service. The speech-based service performs automatic speech recognition (ASR) and natural language understanding (NLU) on the audio to determine a meaning of the user speech. Meanings may include, as examples, "play music," "pause," "stop," "set alarm," "call Bob," "play weather briefing," "play current news headlines," "order pizza," "compose email," "volume up," "volume down," "mute," "set alarm," "cancel," etc.

In response to determining a meaning of the user speech, the speech-based service determines which of numerous available or active applications should be selected to respond to the meaning. Individual applications may register with the speech-based service to indicate the meanings they are capable of handling. Multiple applications may be registered for handling an individual meaning. As an example, several applications may be registered to respond to the "stop" meaning by performing a "stop" action with respect to the activities being performed by the applications. Note that the action resulting from a "stop" meaning depends on the application that is eventually asked to handle or respond to the meaning. For example, one application may stop playing music while another application may stop or cancel an alarm. More generally, the action resulting from any particular meaning may differ depending on the application that receives and responds to the meaning. In some cases, an application may respond to a particular meaning by initiating a subsequent dialog turn, such as by generating a speech response to the meaning of the user speech. The speech response may request clarifying information that will allow the speech-based service to fully determine an intent of the user. In other cases, an application may respond by performing an action that is indicated at least in part by the meaning, such as "Play music by Artist A."

When an individual application instructs the audio device to initiate an activity, the application provides an application identifier that is associated with the application. As the audio device performs the activity, the audio device sends event messages to the speech-based service regarding the activity. For example, an event message may indicate that requested music has started playing, that a specific track of a playlist has started playing, that speech has begun or ended, that a notification is being given, and so forth. Each event message indicates the application identifier of the application that is responsible for the activity to which the event relates. The event messages are passed to the applications corresponding to the application identifiers.

When a user speaks, the speech-based system performs ASR and NLU to recognize the speech of the user and to determine a meaning of the speech. However, it may be that neither the speech itself nor the determined meaning of the speech indicates to which of the multiple available applications the speech is being directed. Accordingly, the speech-based system has a routing component that monitors activities of the audio device to keep track of which applications should be considered currently active for purposes of responding to the determined meanings of user speech.

The routing component works by monitoring the event messages received from the audio device to determine which application or applications should be currently considered active. More specifically, the routing component tracks which applications are responsible for the most recent audio events reported by the audio device. In response to an event message that identifies a responsible application, the routing component designates the responsible application as being primarily active or secondarily active. A primarily active application is said to have primary speech focus. A secondarily active application is said to have secondary speech focus. A determined meaning of recognized user speech is offered first to the application that currently has primary speech focus. If no application has primary speech focus or if the application with primary speech focus is not able to handle the meaning, the meaning is then offered to the application that has secondary speech focus.

In order to keep track of which applications currently have primary and secondary speech focus, the routing component monitors event messages from the audio device regarding audio played by the audio device. An individual event message identifies an application that is responsible for the audio and also indicates a classification of the audio. As an example, the classification may indicate whether or not the audio is part of a user interaction. If the classification indicates that the audio is part of a user interaction, the routing component designates the responsible application as having primary speech focus. If the classification indicates that the audio is not part of a user interaction, the routing component designates the responsible application as having secondary speech focus. In the described embodiment, only one of the applications (e.g., the application that has been most recently designated as being primarily active) has primary speech focus and only one of the applications (e.g., the application that has been most recently designated as being secondarily active) has secondary speech focus.

More generally, primary speech focus is granted based on the occurrences of activities that involve or are intended to initiate two-way user interactions, such as speech dialogs and active user notifications. Secondary speech focus is granted based on occurrences of activities that do not involve two-way user interactions, such as passive notifications and music playback.

Figure 1:
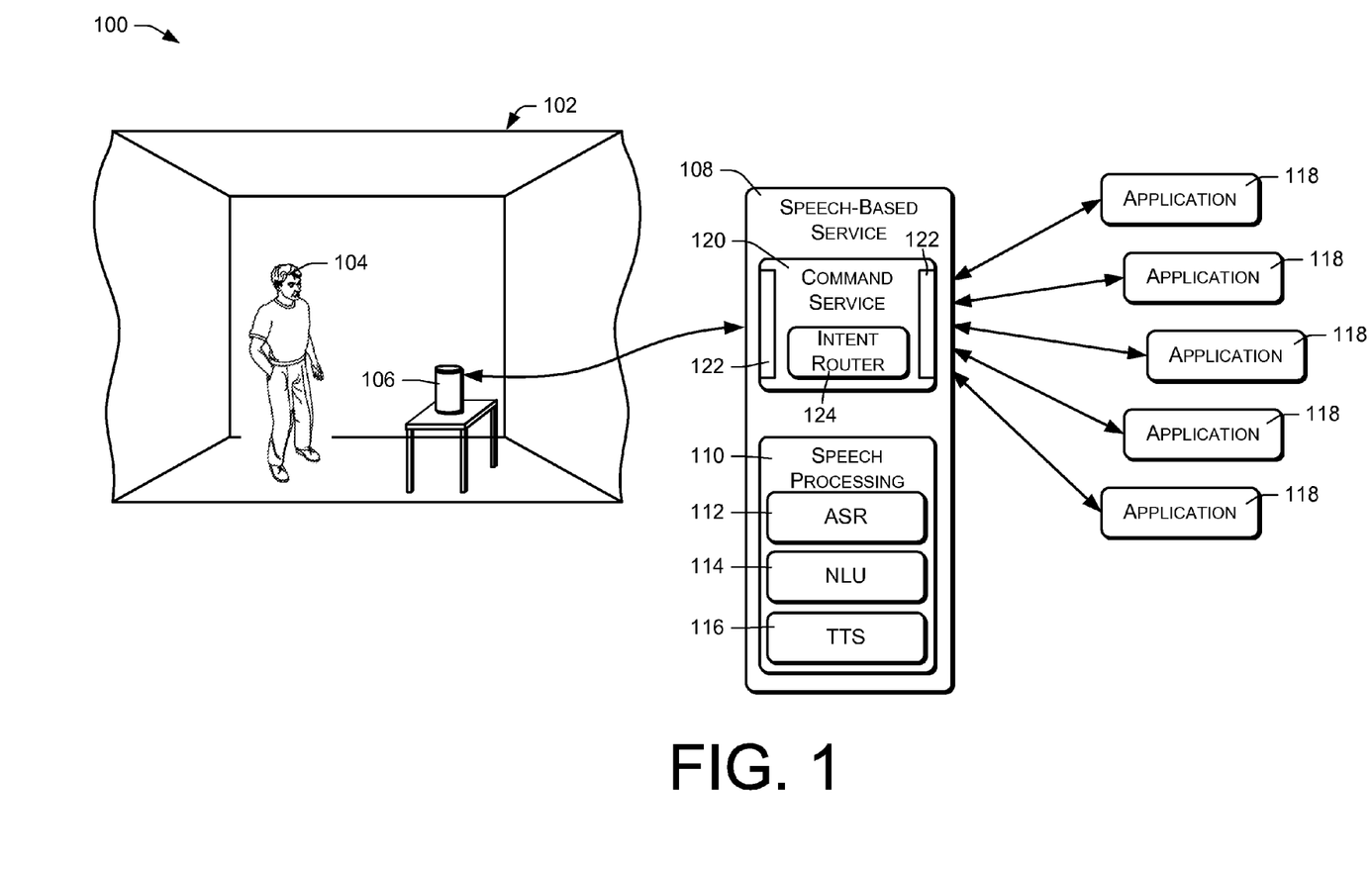
FIG. 1 is a block diagram of a voice interaction computing architecture that includes a local audio device and a remote speech-based service.

FIG. 1 illustrates an environment 100 in which these techniques may be practiced. The environment 100 may comprise a room or other user premises 102. User premises may include houses, offices, automobiles, and other spaces or areas.

Within the user premises 102 is a user 104 and one or more audio devices 106. An audio device 106 may in some embodiments comprise a network-based or network-accessible device having one or more microphones, a speaker, and a network interface or other communications interface. In certain embodiments, the audio device 106 may also have other elements designed for user interaction, including buttons, knobs, lights, indicators, and various types of sensors, input elements, and output elements.

The audio device 106 receives spoken commands from the user 104 and provides services in response to the commands. Provided services may include performing actions or activities, rendering media, obtaining and/or providing information, monitoring local conditions and providing notifications based on local conditions, providing information via generated or synthesized speech via the audio device 106, initiating Internet-based services on behalf of the user 104, and so forth.

In the embodiment shown in FIG. 1, the audio device 106 communicates with a network-accessible speech-based service 108. The speech-based service 108 may be implemented as a network-based or cloud-based service that is located remotely with respect to the audio device 106. For example, the speech-based service 108 may be implemented by a business organization and/or service provider to support multiple audio devices 106 that are located in different user premises 102, which in turn may be located in widely varying geographic locations.

The speech-based service 108 may in some instances be part of a network-accessible computing platform that is maintained and accessible via a wide-area network such as the Internet. Network-accessible computing platforms such as this may be referred to using terms such as "on-demand computing", "software as a service (SaaS)", "platform computing", "network-accessible platform", "cloud services", "data centers", and so forth.

Communications between the audio device 106 and the speech-based service 108 may be implemented through various types of data communications networks, including local-area networks, wide-area networks, and/or the public Internet. Cellular and/or other wireless data communications technologies may also be used to communicate with the speech-based service 108. The user premises 102 may include local network support equipment to facilitate communications with the speech-based service 108, such as wireless access points, network routers, communication hubs, etc.

The speech-based service 108 may interact with a variety of services and/or applications in support of multiple audio devices 106. As an example, such services may include speech processing services 110. The speech processing services 110 may be configured to receive real-time audio or speech information from the audio device 106 in order to recognize user speech, to determine user meanings expressed by the speech, and to perform actions or provide services in fulfillment of user meanings. For example, the user may speak predefined commands (e.g., "Awake";

"Sleep"), or may use a more casual conversation style when interacting with the audio device 106 (e.g., "I'd like to go to a movie. Please tell me what's playing at the local cinema."). User commands may be for essentially any type of operation, such as database inquires, requesting and consuming entertainment (e.g., gaming, finding and playing music, movies or other content, etc.), personal management (e.g., calendaring, note taking, etc.), online shopping, financial transactions, and so forth.

Speech and speech-related information may be provided to the speech processing services 110 in many different forms. In some implementations, the speech-related information may comprise a continuous audio signal or stream from the audio device 106. Alternatively, the speech-related information may comprise audio clips or segments, provided to the speech processing services 110 in response to detected sound within the user premises 102. In some cases, the audio device 106 may perform speech recognition and provide user speech in the form of text to the speech-based service 108. In some implementations, the speech-based service 108 may interact with the user 104 by generating or specifying speech that is in turn rendered by the audio device 106. Speech synthesis may be performed by the speech processing services 110 or by the audio device 106.

In the described embodiment, the speech processing services 110 include components or functionality for recognizing speech, understanding meanings of recognized speech, and for generating speech. Specifically, the speech processing services 110 include an automatic speech recognition (ASR) service 112, a natural language understanding (NLU) service 114, and a text-to-speech (TTS) service 116. Various other type of speech processing functionality may also be provided.

The ASR service 112 may use various techniques to create a full transcript of speech words represented in an audio signal. For example, the ASR service 112 may reference various types of models, such as acoustic models and language models, to recognize words of speech that are represented in an audio signal. In many cases, models such as these are created by training, such as by sampling many different types of speech and manually classifying.

An acoustic model may represents speech as a series of vectors corresponding to features of an audio waveform over time. The features may correspond to frequency, pitch, amplitude, and time patterns. Statistical models such as Hidden Markov Models (HMMs) and Gaussian mixture models may be created based on large sets of training data. Models of received speech are then compared to models of the training data to find matches.

Language models describe things such as grammatical rules, common word usages and patterns, dictionary meanings, and so forth, to establish probabilities of word sequences and combinations. Analysis of speech using language models may be dependent on context, such as the words that come before or after any part of the speech that is currently being analyzed.

ASR may provide recognition candidates, which may comprise words, phrases, sentences, or other segments of speech. The candidates may be accompanied by statistical probabilities, each of which indicates a "confidence" in the accuracy of the corresponding candidate. Typically, the candidate with the highest confidence score is selected as the output of the speech recognition.

The NLU service 114 analyzes a word stream provided by the ASR service 112 and produces a representation of a meaning of the word stream. For example, the NLU service 114 may use a parser and grammar rules to analyze a sentence and to produce a representation of a meaning of the sentence in a formally defined language that conveys concepts in a way that is easily processed by a computer. For example, the meaning may be semantically represented as a hierarchical set or frame of slots and slot values, where each slot corresponds to a semantically defined concept. Thus, the meaning of the sentence may be semantically represented by the frame of slots and slot values. NLU may also use statistical models and patterns generated from training data to leverage statistical dependencies between words in typical speech.

The speech-based service 108 may be configured to support a plurality of network-based applications 118. The applications 118 interact with the audio device 106 through the speech-based service 108 to provide functionality in conjunction with the audio device 106, based at least in part on user speech that is captured or provided by the audio device 106. More specifically, the applications 118 are configured to communicate through a command service 120 of the speech-based service 108, which acts as a device proxy to receive information from the audio device 106 and to provide instructions, information, and content to the audio device 106. In some cases, the command service 120 may use a first set of data formats and/or protocols to communicate with the audio device 106, allowing transfer of relatively low-level or detailed data. The command service 120 may use a second set of data formats and/or protocols to communicate with the applications 118, allowing information to be transferred at a relatively higher level of abstraction or using different types of communications protocols.

The applications 118 may in some cases be implemented as web-based or network-based applications or services. For example, a particular application 118 may be implemented as a server or service by the provider of the speech-based service 108 or by a third-party provider, and may communicate with the command service 120 through a network such as the Internet. In other cases, an application 118 may reside or be installed on a physical device associated with the user 104, such as a computer or mobile device of the user 104, and may communicate with the command service 120 through the Internet or other wide-area network.

The speech-based service 108 and the command service 120 may be configured to interact with the audio device 106 and/or the applications 118 according to a web services model and the functionality of the speech-based service 108 may be implemented as one or more web services. Generally, a web service may comprise any type of computing service that is made available to a requesting client via a request interface that includes one or more Internet-based application layer data transport protocols, such as a version of the Hypertext Transport Protocol (HTTP) or another suitable protocol.

The command service 120 may expose one or more network-accessible APIs or application interfaces 122. The APIs 122 may be implemented as a web services endpoints, having Uniform Resource Locators (URLs), e.g., http://storageservice.domain.com.

The applications 118 may be designed and provided by various venders and/or providers to work in conjunction with the audio device 106 and/or to provide services using the audio device 106, by way of the APIs 122 and associated services. The applications 118 may provide functionality ranging from email to games. The applications 118 may comprise speech-enabled applications that that perform actions in response to user speech and meanings derived from user speech. Accordingly, the applications 118 may base their services in part on speech and speech-related information that is provided by the audio device 106 and the speech processing services 110, including recognized speech, meanings derived from speech, and intents or commands that have been interpreted from user speech. In addition, the applications 118 may provide text that is to be rendered as speech that on the audio device 106, and may provide other instructions and commands to or for the audio device 106 via the command service 120 and the APIs 122.

In some implementations, the illustrated applications 118 may be components of other applications, such as so-called "applets." Each application or applet may be identified by an application identifier. The application identifier may be assigned by the speech-based service 108 or provided by the application itself.

As one example, an application may comprise an audio application that provides music or other content to the audio device 106 to be presented by the audio device 106.

Each application 118 may communicate with the command service 120 to indicate or register the speech meanings that it is capable of handling. More than one application 118 may be capable of handling or responding to any given meaning. Alternatively, the command service 120 may query individual applications to receive indications from the applications regarding whether they can or will respond to certain meanings.

The command service 120 includes a routing component 124 that provides recognized or identified speech meanings to appropriate applications 118. As will be described in more detail below, the routing component 124 assigns a primary speech focus and a secondary speech focus, depending on activities currently being performed by the audio device 106. When a meaning is determined, the application having primary focus (if any) is given first opportunity to respond to the meaning.

Figure 2:
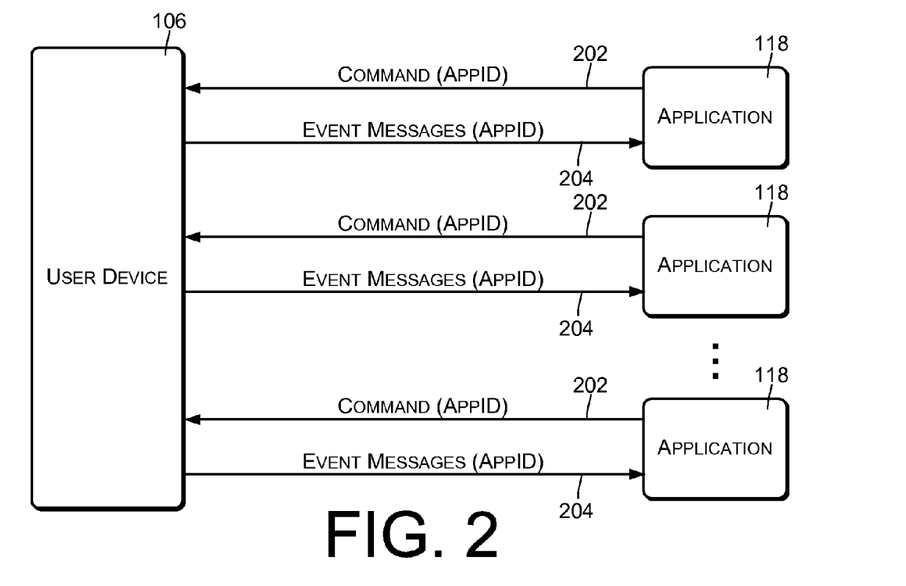
FIG. 2 is a block diagram illustrating an example of information flow between the local audio device and a remote speech-based service.

FIG. 2 illustrates an example of communications that may occur between the applications 118 and the audio device 106. For purposes of clarity, the command service 120, which acts as a communications intermediary, is not shown.

An application 118 may cause a command 202 to be sent to the audio device 106. The command 202 includes or specifies an application identifier, referred to in FIG. 2 as an AppID, that corresponds to and identifies the application 118. The command 202 may specify an activity that is to be conducted or performed by the audio device 106. For example, the command may specify audio content such as music to be played by the audio device 106. As another example, the command 202 may specify text that is to be converted to speech and played as audio by the audio device 106. As another example, the command 202 may configure a notification that is to be implemented by the audio device 106.

In some cases, the command 202 may specify whether the commanded activity or the audio generated by the audio device 106 in response to the activity is to be considered interactive. Audio that forms part of a user interaction, such as speech that is part of a user dialog, may be considered to be interactive. Audio that is not part of a user interaction, such as music, may be considered to be non-interactive. Certain types of rendered speech may be considered to be non-interactive when not part of a user interaction. For example, an application may generate speech to describe current weather or traffic conditions, which would not be part of a speech interaction and would therefore be considered non-interactive.

During operation, the audio device 106 generates and sends event messages 204 back to the command service 120.

Each event message 204 describes an audio event or other event that has occurred at the audio device 106. For example, an event message 204 may specify that a certain type of sound as been played, that text-to-speech playback has started or ended, that non-interactive content has started or stopped, that playback of content or media has progressed to a certain point, that playback of a media item has ended and that playback of a subsequent media item has begun, and so forth. An event message 204 may also specify that an audio notification has been initiated by the audio device.

Each event message indicates the application identifier (AppID) of the application that is responsible for the activity of which the described audio event is a part. The event messages 204 may be passed by the command service 120 to the responsible application, as specified by the AppID, so that the responsible application can monitor the progress of activities it has requested.

Each event message 204 may also specify whether the described audio is interactive or non-interactive. Interactive audio comprises audio that is part of a user interaction. Non-interactive audio is audio that is not part of a user interaction. Some event messages may explicitly specify whether the corresponding event is interactive. In other cases, the nature of the event may inherently indicate whether the corresponding event is interactive. For example, certain events relating to the status of music playback may be considered to be non-interactive events, even though the event messages regarding such events may not explicitly classify the events as being interactive or non-interactive.

Figure 3:
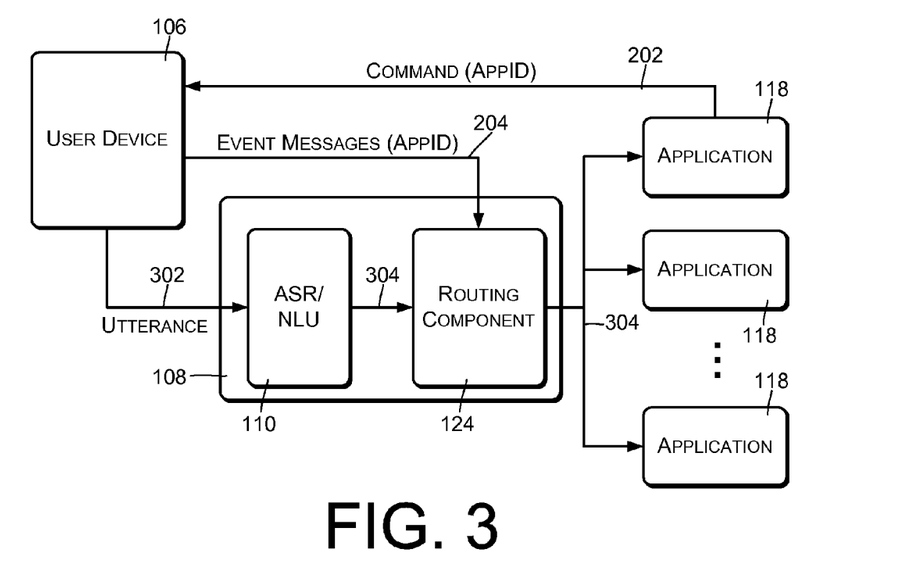
FIG. 3 is a block diagram illustrating an example of information flow relating to routing of meanings to different applications.

FIG. 3 illustrates how the speech-based service 108 processes a received user utterance to provide determined meanings to appropriate applications 118. The audio device 106 captures a user utterance or speech 302 that is transmitted as an audio signal to the speech-based service 108. The speech processing service 110 analyzes the audio signal using ASR and NLU to determine a meaning 304 of the user speech 302. The routing component 124 receives a semantic representation of the meaning 304. The routing component 130 also receives and monitors the event messages 204.

The routing component 130 monitors the event messages 204 as they are produced by the audio device 106 to determine which of the applications 118 are to be considered currently active. In response to the event messages 204, the routing component 124 may identify a primarily active application and/or a secondarily active application. An application identified as a primarily active application is considered to have primary speech focus. An application identified as a secondarily active application is considered to have secondary focus. In the embodiment described herein, no more than a single application is considered to be primarily active at any given time and no more than a single application is considered to be secondarily active at any given time, although this may not always be the case in certain other embodiments.

Upon receiving the semantic representation of the meaning 304, the routing component 124 provides the representation of the meaning 304 to one of the applications 118 based on the previous identification of the applications that are primarily and secondarily active. Generally, an application that is primarily active is given the first chance to handle the meaning if it is able. Otherwise, if there is no application that is currently primarily active or if the currently primarily active application is not able to handle the meaning, an application that is currently secondarily active is given a chance to handle the meaning.

Designating applications as primarily or secondarily active is performed as a background operation, in response to receiving the event messages 204 from the audio device 106. Routing of meanings is performed independently of and asynchronously to the process of designating applications as primarily or secondarily active, as utterances are received from the audio device 106.

Figure 4:
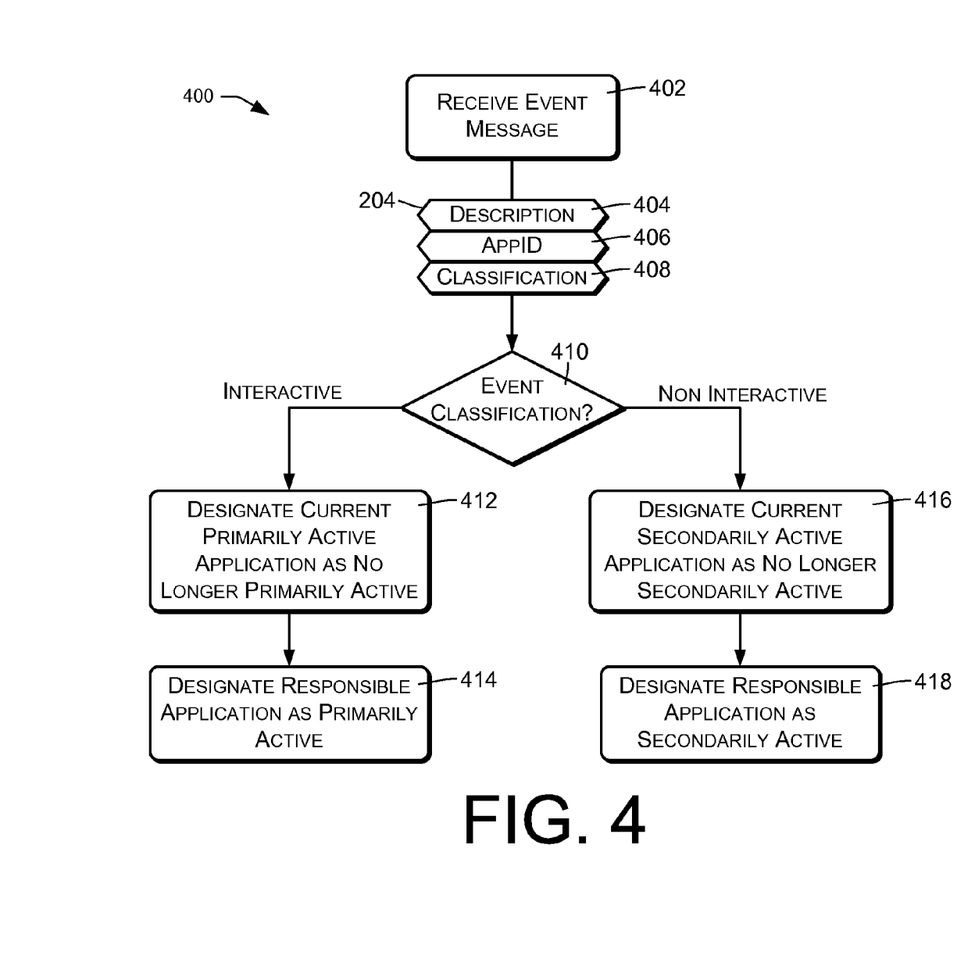
FIG. 4 is a flow diagram illustrating an example method of selecting and/or specifying primarily active and secondarily active applications.

FIG. 4 illustrates an example method 400 that may be performed by the routing component 124 to select a primarily active application and a secondarily active application based on event messages received from the audio device 106.

An action 402 comprises receiving the event message 204 from the audio device regarding audio played by the audio device as part of an activity. The event message 204 may comprise an event description 404 and an application identifier 406 corresponding to the application 118 that is responsible for the audio event and/or for the activity of which the described audio event is a part.

The event message 204 may in some cases also contain an event classification 408 indicating whether the audio of the audio event is to be considered interactive or non-interactive. Interactive audio may include speech that is part of a speech dialog or interaction with a user. Other types of audio, such as music or speech that are not part of a speech dialog or interaction with the user, may be considered to be background or non-interactive audio. In some cases, the event classification 408 may be omitted from the event message 204 and the nature of the event or other metadata provided with the event message 204 may indicate whether or not the corresponding event is interactive.

In addition to dialog speech, certain types of notifications generated by the audio device 106 in response to conditions monitored by the audio device 106 may be considered to be interactive. Although such notifications are not necessarily part of a speech dialog, they may be considered to be part of a user interaction in that they solicit immediate user input. For example, a notification may comprise an audible alarm sound to which the user is expected to reply such as by speaking the words "stop alarm."

Other types of notifications generated by the audio device 106 in response to conditions monitored by the audio device 106 may be considered to be non-interactive. For example, a notification may comprise a background sound intended to alert the user of a non-critical condition such as receipt of a message or email, which is not intended to solicit immediate user input.

Generally, the classification 408 or other information associated with an event message may indicate that the corresponding audio comprises:
    speech that is part of a user interaction;
    speech that is not part of a user interaction;
    audio content that is part of a user interaction;
    audio content that is not part of a user interaction; or an audio notification given in response to detection by the audio device of a condition.

An audio notification may comprise either a background audio notification that is not part of a user interaction or a foreground audio notification that is part of a user interaction.

An action 410 comprises determining whether the event classification 408 or other data of the event message 204 indicates that the received event message is for an interactive event or a non-interactive event. In cases where the event message 204 explicitly provides the classification 408, this may involve examining the classification 408. Otherwise, the action 410 may comprise determining whether the corresponding event is interactive based on the type or description of the event, wherein certain events or types of events are defined as being interactive and other events or types of events are defined as being non-interactive. In some cases, for example, events relating to playback of media such as music may be considered to be non-interactive by definition.

If the event is interactive, an action 412 is performed of designating any currently designated primarily active application other than the responsible application as being no longer primarily active. In addition, an action 414 is performed of designating the responsible application (indicated by the application identifier 406) as now being primarily active and having primary focus.

If the event is non-interactive and/or the responsible application is not designated as being primarily active by the action 414, an action 416 is performed of designating any currently designated primarily active application other than the responsible application as being no longer secondarily active. In addition, an action 418 is performed of designating the responsible application (indicated by the application identifier 406) as now being secondarily active and having secondary focus.

Note that certain types of events may inherently be associated with corresponding applications, and the application identifier may in these cases be omitted. For example, messages relating to playback of audio received from Bluetooth® peripherals of the audio device 106 may be inherently associated with a particular one of the applications 118.

Figure 5:
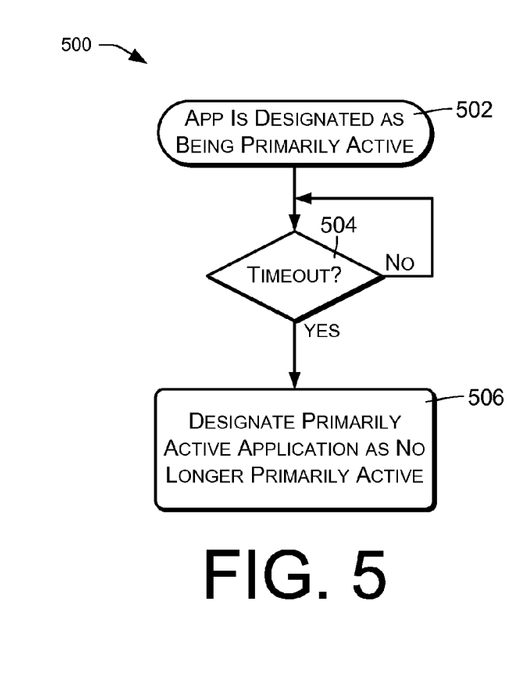
FIG. 5 is a flow diagram illustrating an example method of implementing a timeout for primarily active applications.

FIG. 5 illustrates an example method 500 that may be performed with respect to a responsible application that has been designated as being primarily active, as indicated at block 502, such as may happen in accordance with the method 400 of FIG. 4. An action 504 comprises determining whether a predefined time period has elapsed or timeout has expired. If the time period has elapsed or the timeout has expired, an action 506 is performed of removing the designation of the responsible application as being primarily active. If the time period has elapsed or the timeout has not expired, the action 504 is repeated in a loop. The time period may be reset every time the currently designated primarily active application is newly designated as being primarily active, such as in response to a newly received event message that results in reassignment of primary focus through the action 416 of FIG. 4.

The method 500 ensures that a primarily active application will lose speech focus if no event message specifying an interactive events for the application is received over a specified time period. The application may later regain primary focus if a new event message is received that specifies the application identifier of the application and that specifies an interactive event classification.

Figure 6:
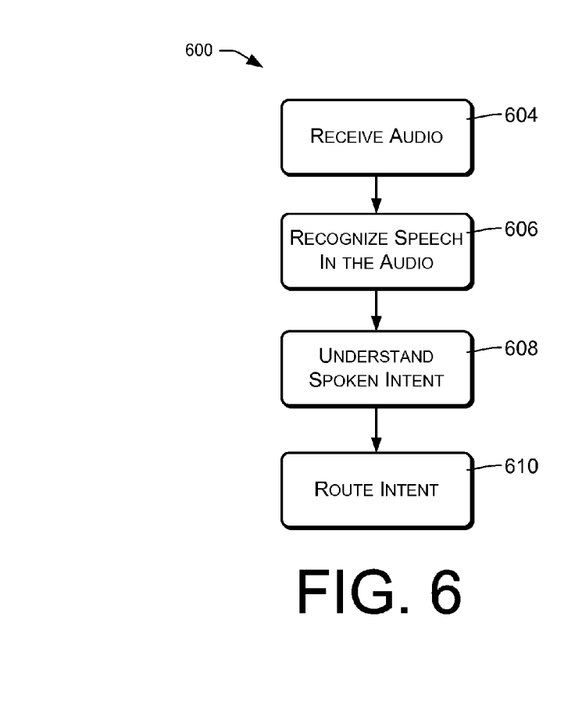
FIG. 6 is a flow diagram illustrating an example method of processing audio from a local audio device to determine and respond to meanings expressed by a user.

FIG. 6 shows an example method 600 of processing user speech. An action 602 comprises receiving and audio signal containing user speech. An action 604 comprises analyzing the audio signal using ASR to recognize the user speech and to product a transcript of the user speech. An action 606 comprises analyzing the recognized speech using NLU to determine a meaning of the user speech and to generate a semantic representation of the user speech and its meaning. An action 608 comprises routing the representation to one or more of the applications 118.

Figure 7:
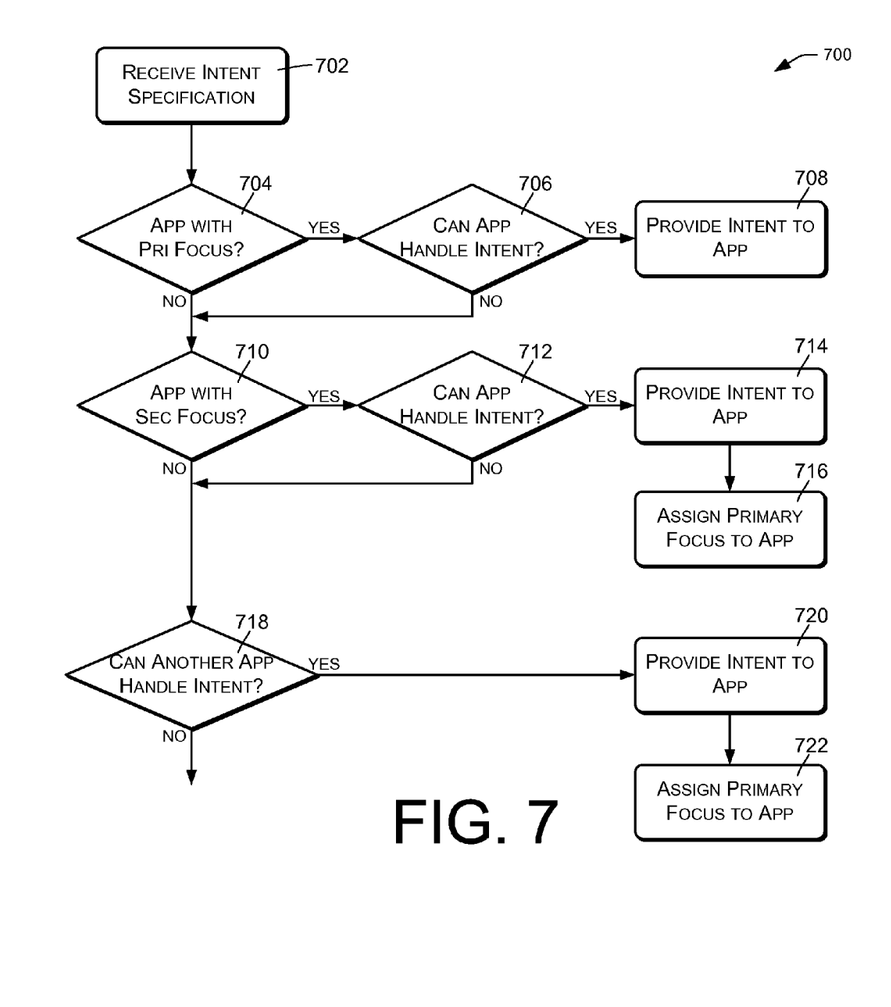
FIG. 7 is a flow diagram illustrating an example method of routing meanings derived from user utterances.

FIG. 7 shows an example method 700 of routing a semantic representation of a speech meaning to one of multiple applications 118. An action 702 comprises receiving the representation of the meaning. An action 704 comprises determining whether there is an application among the multiple applications 118 that has been designated as being primarily active and therefore having primary focus. If there is such a primarily active application, an action 706 is performed of determining whether the primarily active application can respond to the meaning. The action 706 may be performed by referencing previous registrations of the applications that indicate which meanings can be handled by which applications. Alternatively, the primarily active application can be queried to determine whether it can currently respond to the meaning. If the primarily active application can or will respond to the meaning, an action 708 is performed of providing the semantic representation of the meaning to the application and/or requesting the primarily active application to respond to the meaning. In some cases the actions 706 and 708 may be combined: the representation of the meaning may be passed to the primarily active application along with a request for the application to respond to the meaning, and the application may respond by either accepting the request or indicating that the application will not respond to the meaning.

If there is no application that is currently primarily active, if the primarily application indicates that it will not or is not capable of responding to the determined meaning, or if it is otherwise determined that the primarily active application will not respond to the meaning, an action 710 is performed of determining whether there is an application among the multiple applications 118 that has been designated as being secondarily active and therefore having secondary focus. If there is such a secondarily active application, an action 712 is performed of determining whether the secondarily active application is able to respond to the determined meaning. The action 712 may be performed by referencing previous registrations of the applications that indicate which meanings can be handled by which applications. Alternatively, the secondarily active application can be queried to determine whether it can currently respond to the determined meaning. If the secondarily active application can or will respond to the meaning, an action 714 is performed of providing the semantic representation of the meaning to the secondarily active application and/or requesting the secondarily active application to respond to the meaning. In some cases the actions 710 and 712 may be combined: the semantic representation of the meaning may be passed to the secondarily active application along with a request for the secondarily active application to respond to the meaning, and the application may respond by either accepting the request or declining the request.

An action 716 may also be performed when the secondarily active application responds to a meaning or when the secondarily active application indicates that it can respond to the meaning. The action 716 comprises designating the secondarily active application as now being primarily active and therefore having primary speech focus. When the application is designated as being primarily active, any other application that was previously designated as being primarily active is then designated as being no longer primarily active. Note that the action 716 may in certain embodiments be performed only for certain types of applications or events. As an example, the meaning "raise volume" may be considered a transient command or event and may not result in the corresponding application being given primary focus.

If there is no application that is currently secondarily active, if the secondarily active application indicates that it will not or is not capable of responding to the determined meaning, or if it is otherwise determined that the secondarily active application will not respond to the meaning, an action 718 is performed of determining whether there is a another application among the multiple applications that can handle the determined meaning. The action 718 may be performed by referencing previous registrations of the applications that indicate which meanings can be handled by which applications. Alternatively, or in addition, other applications can be queried to determine whether they can currently respond to the meaning. If another application can handle the meaning, an action 720 is performed of providing the representation of the meaning to the other application and/or requesting that the other application respond to the meaning.

An action 722 may also be performed when one of the other applications responds to a meaning event or when an otherwise non-active application indicates that it can respond to the meaning. The action 722 comprises designating the responding application as being primarily active and therefore having primary speech focus. When the application is designated as being primarily active, any other application that was previously designated as being primarily active is then designated as being no longer primarily active. Note that the action 722 may in certain embodiments be performed only for certain types of applications or events that are not considered to be transient.

The action 718 may comprise offering the semantic representation of the meaning to different applications in the order in which they registered with the command service 120, with earlier registered applications being given priority over later registered applications. Alternatively, each application may be asked to provide a confidence level indicating a likelihood that the meaning is intended for the application. For example, a music playback application may consider itself to be a relatively unlikely recipient of a "pause" meaning when it is not currently playing music, even though it may have previously indicated an ability to handle the "pause" meaning. The meaning may then be offered to the application that provides the highest confidence level.

Figure 8:
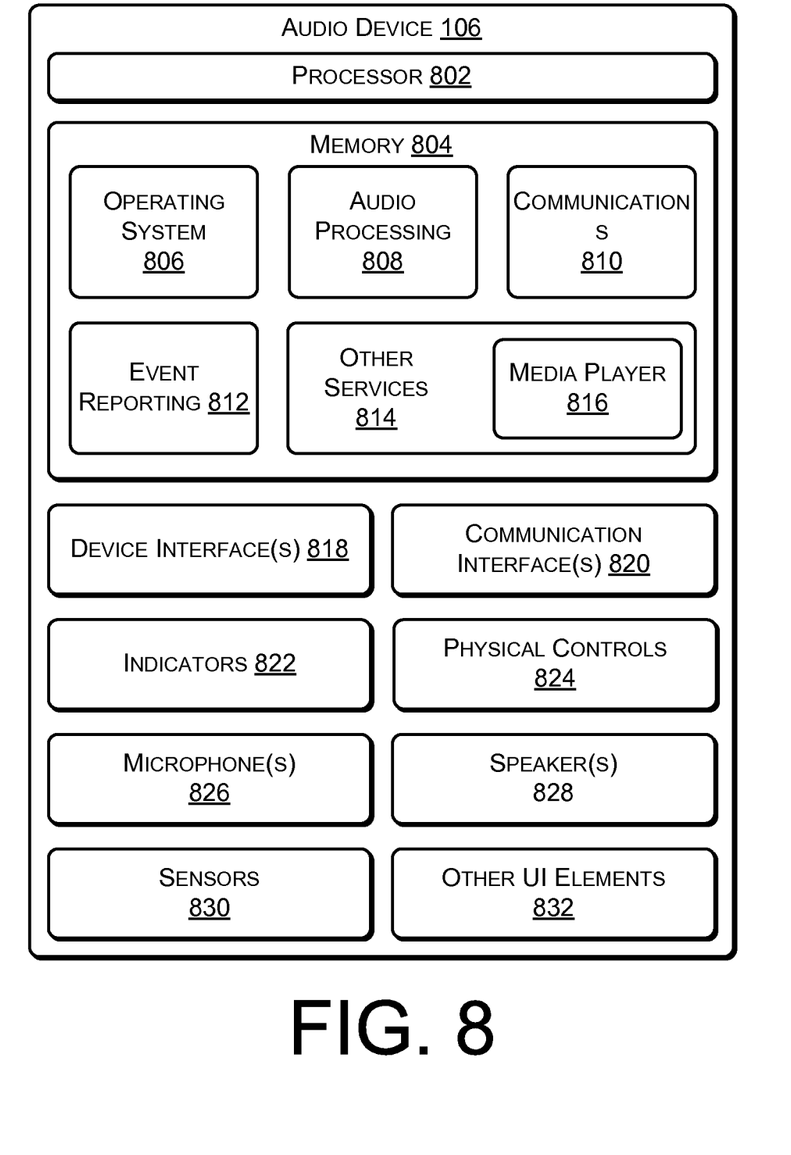
FIG. 8 is a block diagram showing selected functional components of a local audio device.

FIG. 8 shows an example configuration of an audio device 106. In the example of FIG. 8, the audio device 106 has operational logic, which comprises a processor 802 and memory 804. The memory 804 may contain applications and programs in the form of instructions that are executed by the processor 802 to perform acts or actions that implement desired functionality of the audio device 106. The memory 804 may be a type of computer storage media and may include volatile and nonvolatile memory. Thus, the memory 804 may include, but is not limited to, RAM, ROM, EEPROM, flash memory, or other memory technology.

FIG. 8 shows several examples of applications and/or programs that may be provided by the audio device 106 and stored by the memory 804 to implement functionality of the audio device 106, although many other applications and types of functionality may be provided in various embodiments.

The audio device 106 may have an operating system 806 that is configured to manage hardware and services within and coupled to the audio device 106. In addition, the audio device 106 may include an audio processing module 808 that receives audio from the user premises 102 and that processes the received audio to perform actions and provide services in response to user speech. In some cases, the audio processing module 808 may perform speech recognition and natural language understanding with respect to received audio. In other cases, the audio processing module may convey received audio to the speech-based service 108, which may use the speech processing services 110 to perform speech processing, such as speech recognition and natural language understanding. The audio processing module 808 may perform various types of audio processing, including filtering, compressing, and so forth, and may utilize digital signal processors or other methods of signal processing.

The audio processing module 808 may also be responsible for producing or generating speech. For example, the audio device 106 may receive text from the speech-based service 108, and may convert the text to speech. Alternatively, the audio device 106 may receive an audio signal that is processed by the audio processing module 808 for rendering by the audio device 106.

The audio device 106 may have a communications component 810 that is configured to establish a communications channel with the speech-based service 108. Various types of communication protocols may be supported by the communications component 810. In some cases, the communications component 810 may be configured to establish a secured and/or encrypted communications channel with the speech-based service 108 through the APIs 122, using one of various types of network communications technologies.

The audio device 106 may also have an event reporting module 812 that is configured to provide event messages as described above in response to audio activities performed by the audio device 106. In some implementations, the audio device 106 may proactively provide event messages to the speech-based service 108. In other implementations, the speech-based service may poll or query the audio device 106 to obtain event messages.

In addition to the software functionality described above, the audio device 106 may implement various types of other applications, functions, and/or services 814. For example, the other services 814 may include an audio function or application, referred to as a media player 816 in FIG. 8, for playing songs or other types of audio in response to user instructions or under the direction of the speech-based service 108 or the applications 118. The media player 816 may receive audio from the speech-based service 108, from one or more of the applications 118, or from third-party services such as music services, podcast services, and so forth. For example, the speech-based service 108 and/or one of the applications 118 may instruct the audio device 106 to obtain and play a particular song from a third-party service. Upon receiving this instruction, the media player 816 of the audio device 106 may contact the third-party service, initiate streaming or downloading of the song, and may then play the song without further instructions or information from the speech-based service 108 or the application 118 that instructed the audio device 106 to play the song. Similarly, a playlist may be provided to the media player 816 for playback by the media player 816 of the audio device 106.

The audio device 106 may also include various types of hardware-based components or functionality, including device interfaces 818 and communications interfaces 820. The device interfaces 818 may provide connections to auxiliary devices such as Bluetooth™ devices, remote presentation devices, remote sensors, etc. The communication interfaces 820 may include network interfaces and other types of interfaces that allow the audio device 106 to connect to and communicate with the speech-based service 108.

The audio device 106 may have various types of indicators 822, such as lights that are used to communicate operating information to the user 104. The indicators 822 may include LEDs (light-emitting diodes), flat-panel display elements, text displays, etc.

The audio device 106 may also have various types of physical controls 824, which may include buttons, knobs, sliders, touch sensors, etc. The physical controls 824 may be used for basic functionality such as enabling/disabling the audio device 106, setting the audio output volume of the audio device 106, and so forth.

The audio device 106 may include a microphone unit 826 that includes one or more microphones to receive audio input, such as user voice input. The microphone unit 826 may comprise a directional microphone array in some implementations, so that sounds from different directions may be selectively received and/or enhanced. The audio device 106 may also include a speaker 828 for output of audio.

In addition to the physical controls 824 and the microphone unit 826, the audio device 106 may have various other types of sensors 830, which may include still and video cameras, depth sensors, 3D (three-dimensional) camera, infrared sensors, proximity sensors, sensors for measuring levels of ambient sound and light, and so forth. The audio device 106 may also have analytic capabilities that utilize information from the sensors 839 to determine characteristics of the user premises 102 and environmental conditions within the user premises 102. For example, the audio device 106 may be capable of analyzing optical information to determine 3D characteristics of a room, including the presence and/or identity of people or objects within the room. As another example, the audio device 106 may be capable of detecting and evaluating audio characteristics of a room in order to optimize audio playback.

The audio device 106 may also have other user interface (UI) elements 832 for interacting with the user 104. The other UI elements may include display panels, projectors, touch panels, keyboards, etc.

In certain situations, the audio device 106 may comprise a mobile device such as a smartphone, tablet computer, glasses, watch, etc. Mobile devices may have sensors such as compasses, accelerometers, gyroscopes, global positioning receivers, and so forth, as well as having capabilities of determining various environmental information based on applications and access to network-based information resources.

Figure 9:
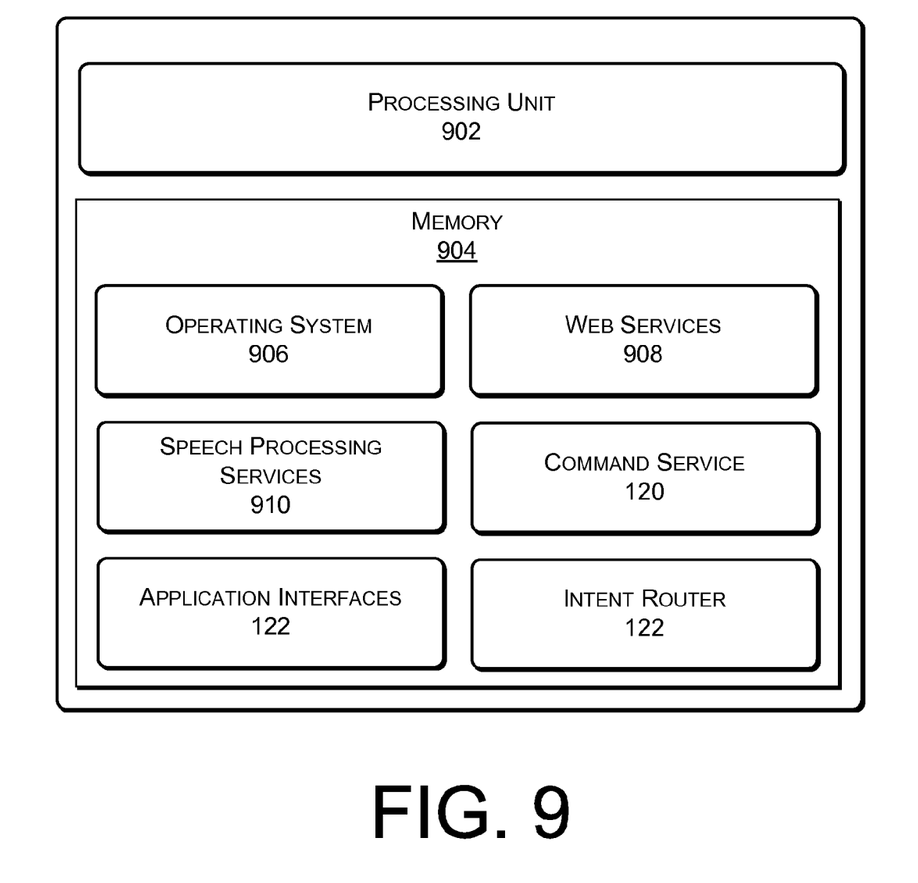
FIG. 9 is a block diagram illustrating components of a server device that may be used in part to implement the speech-based services described herein.

FIG. 9 illustrates relevant components of a server 900 that may be used to implement the functionality of the speech-based services 108 and/or other components that may be used to provide services as described herein. Generally, functional elements may be implemented by one or more servers, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises.

In a very basic configuration, an example server 900 may comprise a processing unit 902 composed of one or more processors and associated memory 904. Depending on the configuration of the server 900, the memory 904 may be a type of computer storage media and may include volatile and nonvolatile memory. Thus, the memory 904 may include, but is not limited to, RAM, ROM, EEPROM, flash memory, or other memory technology.

The memory 904 may be used to store any number of functional components that are executable by the processing unit 902. In many embodiments, these functional components comprise instructions or programs that are executable by the processing unit 902, and that when executed implement operational logic for performing the actions described above.

Functional components stored in the memory 904 may include an operating system 906 and a web service component 908 that interacts with remote devices such as computers, media consumption devices, and so forth. The memory 904 may also have instructions implementing the speech processing services 110, the command services 120, the APIs 122, and the routing component 124. In some cases, one or more of the applications 118 may also be implemented as functional components stored in the memory 904.

The server 900 may of course include many other logical, programmatic, and physical components that are not shown in FIG. 0.

Note that although the audio device 106 is described herein as a voice-controlled or speech-based audio device for use in a home, the techniques described herein may be implemented in conjunction with various different types of devices, such as telecommunications devices and components, hands-free devices, entertainment devices, media playback devices, tablet computers, personal computers, special-purpose devices, and so forth.

The embodiments described above may be implemented programmatically, such as with computers, processors, digital signal processors, analog processors, and so forth. In other embodiments, however, one or more of the components, functions, or elements may be implemented using specialized or dedicated circuits, including analog circuits and/or digital logic circuits.

Furthermore, although the subject matter has been described in language specific to certain features, it is to be understood that the subject matter defined in the appended claims is not necessarily limited to the specific features described. Rather, the specific features are disclosed as illustrative forms of implementing the claims.

What is claimed is:

1. A system, comprising:
  a command service configured to: communicate with multiple applications, communicate with an audio device, and send a command to the audio device to perform an activity for an audio application that provides audio content to be played by the audio device, wherein the command specifies an application identifier corresponding to the audio application;
  control logic configured to perform acts comprising:
    receiving an event message from the audio device regarding sound played by the audio device, wherein the event message specifies the application identifier corresponding to the audio application;
    if the event message indicates that the sound played by the audio device is part of a speech interaction with a user, designating the audio application as being primarily active;
    if the event message indicates that the sound played by the audio device is not part of a speech interaction with a user, designating the audio application as being secondarily active;
  a speech recognition service configured to receive an audio signal from the audio device and to recognize user speech in the audio signal;
  a language understanding service configured to determine a meaning of the user speech;
  the control logic being configured to perform further actions comprising:
    if there is a primarily active application among the multiple applications, requesting that the primarily active application respond to the user speech by (a) performing a first action that is indicated at least in part by the meaning of the user speech or (b) generating a first speech response to the user speech; and
    if there is no primarily active application among the multiple applications and if there is a secondarily active application among the multiple applications, requesting that the secondarily active application respond to the user speech by (a) performing a second action that is indicated at least in part by the meaning of the user speech or (b) generating a second speech response to the user speech.

2. The system of claim 1, wherein the event message specifies an event classification indicating whether the sound is part of a speech interaction with the user, the classification indicating that the sound comprises at least one of:
  speech that is part of a user interaction;
  speech that is not part of a user interaction;
  audio content that is part of a user interaction;
  audio content that is not part of a user interaction; or
  an audio notification given in response to detection by the audio device of a condition.

3. The system of claim 1, wherein the event message indicates that the second audio is a notification given in response to detection by the audio device of a condition, the acts further comprising designating the audio application as being primarily active.

4. The system of claim 1, the actions further comprising:
  determining that no event message identifying the audio application has been received for a predefined time period; and
  removing the designation of the audio application being primarily active.

5. A method, comprising:
  providing a command to an audio device to perform an activity, wherein the command identifies a responsible application from among multiple applications;
  receiving an event message from the audio device regarding sound presented by the audio device, the event message identifying the responsible application;
  if the event message indicates that the sound is part of a user interaction, designating the responsible application as being primarily active;
  receiving speech captured by the audio device;
  determining a meaning of the speech; and
  if there is a primarily active application among the multiple applications that can respond to the meaning, requesting the primarily active application to respond to the meaning.

6. The method of claim 5, further comprising:
  if the event message does not indicate that the audio is part of a user interaction, designating the responsible application as being secondarily active; and
  if there is no primarily active application among the multiple applications that can response to the meaning, requesting a secondarily active application of the multiple applications to respond to the meaning.

7. The method of claim 6, further comprising, if there is no primarily active application among the multiple applications that can response to the meaning:
  determining that the secondarily active application can respond to the meaning; and
  designating the secondarily active application as being primarily active.

8. The method of claim 6, further comprising:
  receiving an indication from the primarily active application that the primarily active application will not respond to the meaning; and
  in response to receiving the indication from the primarily active application, requesting the secondarily active application to respond to the meaning.

9. The method of claim 5, further comprising determining that the primarily active application can respond to the meaning before requesting the primarily active application to respond to the meaning.

10. The method of claim 5, wherein the classification indicates that the audio is at least one of:
    speech that is part of a user interaction;
    speech that is not part of a user interaction;
    audio content that is part of a user interaction;
    audio content that is not part of a user interaction; or
    an audio notification given in response to detection by the audio device of a condition.

11. The method of claim 10, wherein the audio notification comprises:
    a background audio notification that is not part of a user interaction; or
    a foreground audio notification that is part of a user interaction.

12. The method of claim 5, wherein:
    the command specifies an application identifier that identifies the responsible application; and
    the event message specifies the application identifier to identify the responsible application.

13. The method of claim 5, further comprising:
    determining that no event message identifying the responsible application has been received for a predefined time period; and
    removing the designation of the responsible application as being primarily active.

14. A method, comprising:
    receiving a first event message from a device regarding a first action performed by the device, the event message identifying a first responsible application from among multiple applications, wherein each of the multiple applications can respond to one or more meanings expressed by user speech;
    determining that the first action is part of a user interaction;
    designating the first responsible application as being primarily active;
    identifying a first meaning of first user speech; and
    determining that there is a primarily active application among the multiple applications that can respond to the first meaning; and
    selecting the primarily active application to respond to the first meaning.

15. The method of claim 14, further comprising:
    receiving a second event message from the device regarding a second action performed by the device, the second event message identifying a second responsible application from among the multiple applications;
    determining that the second action is not part of a user interaction;
    designating the second responsible application as being secondarily active;
    determining a second meaning of second user speech;
    determining that there is no primarily active application among the multiple applications that can respond to the second meaning; and
    selecting the secondarily active application to respond to the second meaning.

16. The method of claim 15, further comprising:
    determining a third meaning of third user speech;
    determining that the primarily active application will not respond to the third meaning; and
    requesting the secondarily active application to respond to the third meaning.

17. The method of claim 15, further comprising:
    determining a third meaning of third user speech;
    receiving an indication from the primarily active application that the primarily active application will not respond to the third meaning; and
    requesting the secondarily active application to respond to the third meaning.

18. The method of claim 14, wherein the event message indicates a classification of the audio, the classification indicating that the audio is:
    speech that is part of a user interaction;
    speech that is not part of a user interaction;
    audio content that is part of a user interaction;
    audio content that is not part of a user interaction; or
    an audio notification given in response to detection by the audio device of a condition.

19. The method of claim 18, wherein the audio notification comprises:
    a background audio notification that is not part of a user interaction; or
    a foreground audio notification that is part of a user interaction.

20. The method of claim 14, wherein the first event message specifies an application identifier that identifies the first responsible application.

* * * * *